United States Patent [19]

Hutzenlaub

[11] 3,932,919

[45] Jan. 20, 1976

[54] GRIPPER RETURN MEANS FOR A MACHINE FOR SIMULTANEOUSLY BIAXIALLY STRETCHING THERMOPLASTIC FILM

[75] Inventor: Armin S. P. Hutzenlaub, Wiehl, Germany

[73] Assignee: Erwin Kampf Maschinenfabrik, Wiehl, Germany

[22] Filed: Dec. 7, 1973

[21] Appl. No.: 422,797

Related U.S. Application Data

[63] Continuation-in-part of Ser. No. 200,499, Nov. 19, 1971, abandoned.

[30] Foreign Application Priority Data

Nov. 26, 1970 Germany............................ 2058262

[52] U.S. Cl.................................. 26/57 R; 425/66
[51] Int. Cl.² .......................................... D06C 3/00
[58] Field of Search........... 26/57 B, 61 B; 264/289; 425/66

[56] References Cited
UNITED STATES PATENTS 3,014,234  12/1961  Koppehele.................... 26/57 B UX
3,123,854  3/1964   Aykanian........................... 26/57 B
3,148,409  9/1964   Bruckner........................ 26/57 B X
3,150,433  9/1964   Kampf............................... 26/57 B
3,256,558  6/1966   Andersen et al..................... 26/57 B
3,445,887  5/1969   Tsien............................. 26/57 B UX
3,755,862  9/1973   Molz............................... 26/57 R
3,755,862  9/1973   Molz............................... 26/57 B

FOREIGN PATENTS OR APPLICATIONS 649,342    9/1962   Canada............................. 26/57 B
1,088,703  9/1960   Germany........................... 26/57 B
1,004,563  9/1965   United Kingdom................. 26/57 B Primary Examiner—Robert R. Mackey
Attorney, Agent, or Firm—Bacon & Thomas

[57] ABSTRACT

A biaxial stretching machine has a return line for each row of grippers, the return line including a storage region defined by a section of storage track and a screw for feeding grippers to the storage track. The screw is of diminishing pitch and is axially compressible to vary the effective capacity of the storage region. In one form the return screw can be compressed by a spindle-nut-arrangement.

8 Claims, 9 Drawing Figures

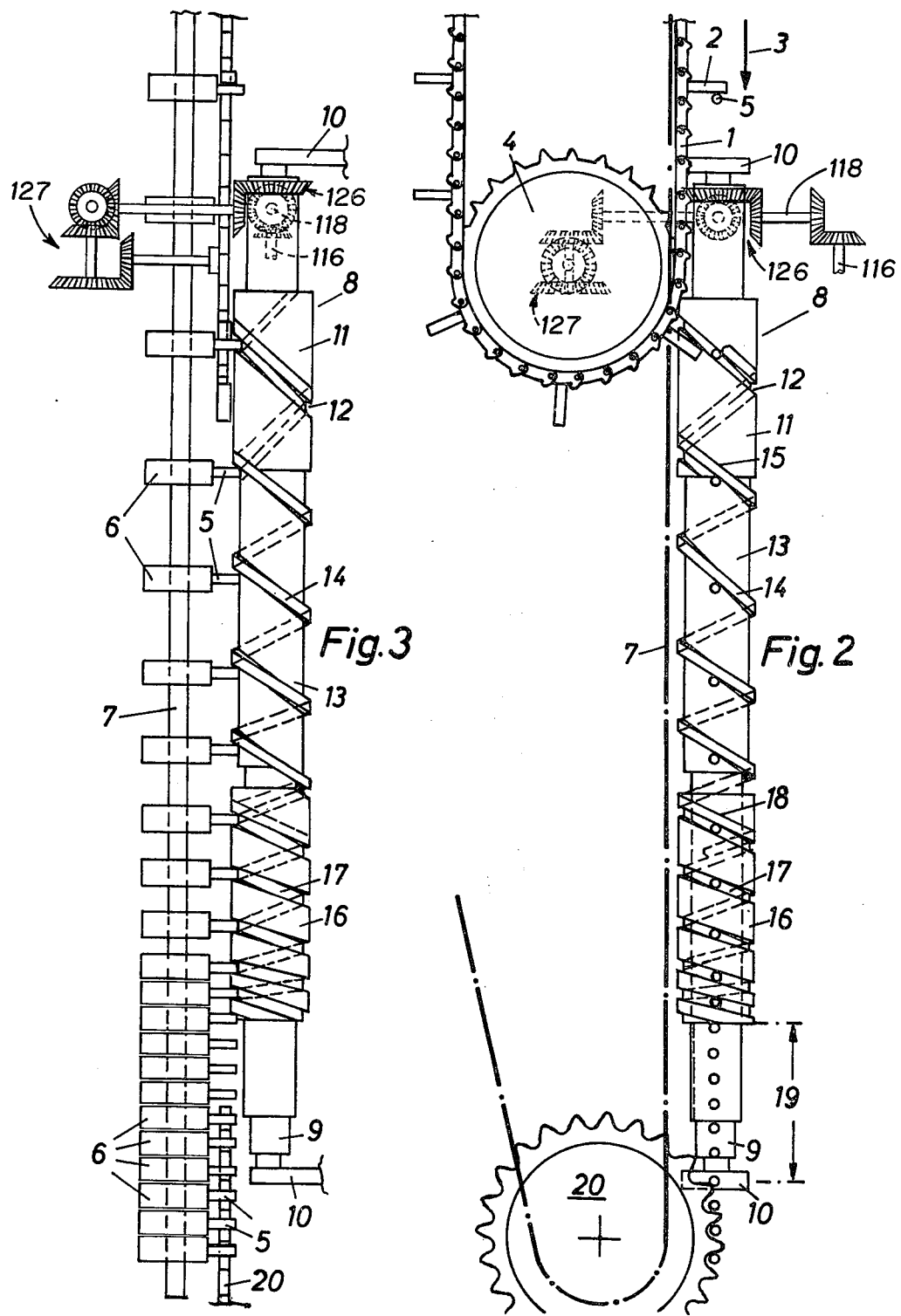

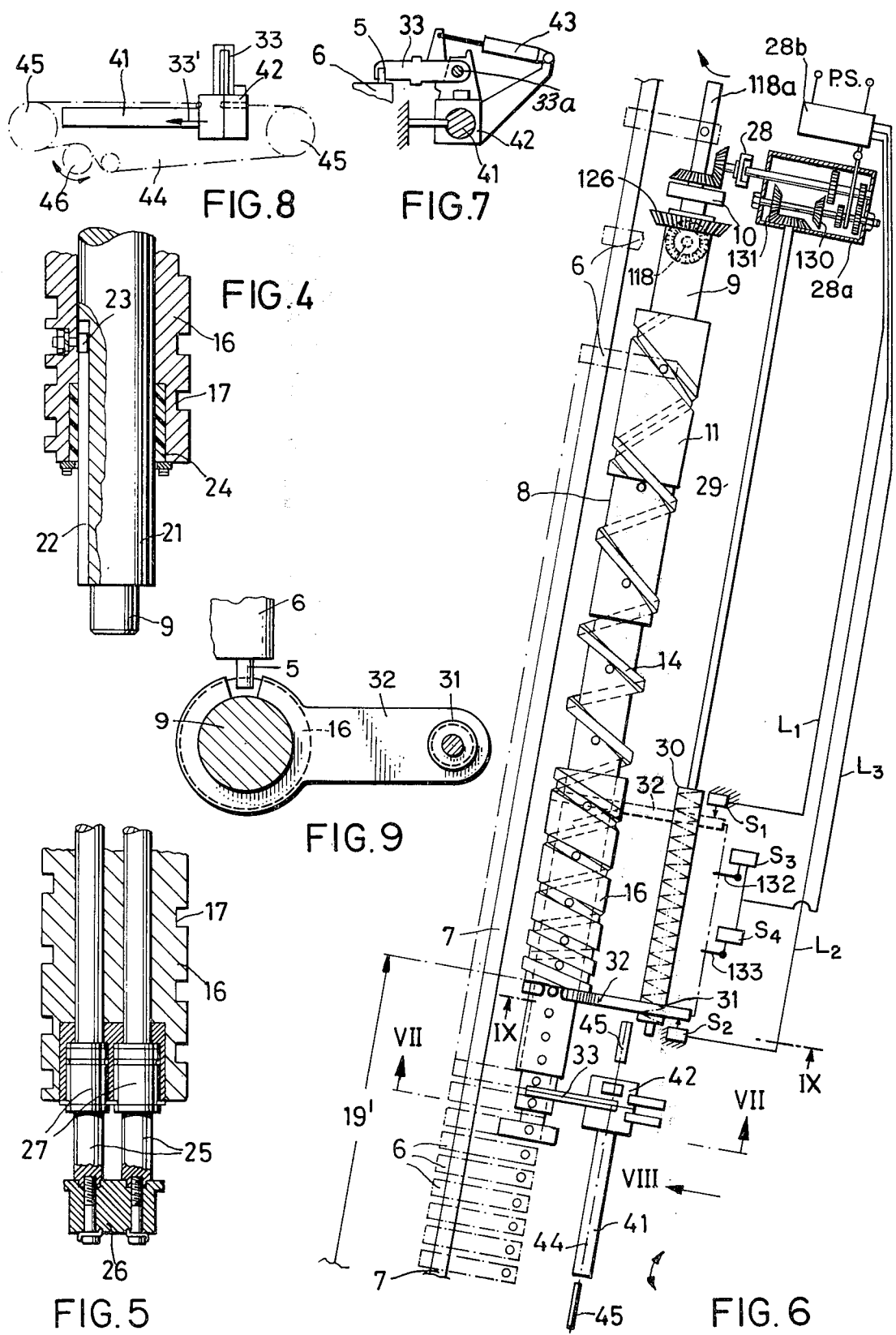

GRIPPER RETURN MEANS FOR A MACHINE FOR SIMULTANEOUSLY BIAXIALLY STRETCHING THERMOPLASTIC FILM

This application is a continuation-in-part of U.S. application Ser. No. 200,499, filed Nov. 19, 1971, now abandoned.

BACKGROUND OF THE INVENTION

The present invention relates to a simultaneous biaxial stretching machine, comprising a gripping means return line system on each side thereof with a guide rail for the gripping means, a return screw with regressive lead and a gripper input means to feed the gripping means to the regular working line of the machine.

The application for which the present invention is intended is the simultaneous longitudinal and transversal stretching of thermoplastic sheets or films.

A simultaneous biaxial stretching machine of the type under consideration has been disclosed in the East German Democratic Republic Pat. No. 23,367 and in the Austrian Pat. No. 243,498, respectively. With each of these machines the gripping means are positively transported by transporting screws, chains feeding wheels etc., for it has been found that such positive transportation and handling of gripping means is an absolute necessity for obtaining perfect operational results. Within range of the stretching line, the gripping means are progressively accelerated with the aid of a transport screw with progressive lead corresponding to the longitudinal stretch ratio concerned, while in the return line the said gripping means are progressively decelerated with the aid of a return screw with regressive lead, for it is not permissible that the gripping means run freely such as on an inclined path because the heavy gripping means might be damaged. The mass of a gripping means is in the range from a few 100 grams up to a few kilograms.

Since it is necessary within such a machine to transport said gripping means in different directions and at varying speeds (including accelerations and decelerations) gripper transport equipment of different types must be used, e.g. transport screws, transport chains and feeding pulleys or wheels. To ensure proper guiding of the gripping means throughout the entire machine, it is a factor of primary importance that speed and the leads of the various transporting facilities be very carefully tuned to each other.

SUMMARY OF THE INVENTION

A machine according to the present invention has normally a length of some 10 meters. A preliminary treating section for heating the sheet normally precedes a stretching section which is followed by an after treatment or cooling section which is required for setting the sheet as stretched. Accordingly, there are major temperature differentials involved which will influence the transporting facilities. This creates great difficulties as far as speed synchronized operation and movement of these transporting means are concerned. These difficulties cannot be overcome by the use of friction belts for taking the gripping means along, since, controlled and positive drive of the grippers cannot be achieved thereby.

It is an object of the present invention to ensure cycle tuned availability of the gripping means at the end of the return line to the gripper input feeding means in advance of the regular working sections of the machine.

This problem is solved by the invention as follows: the returning means comprises a returning screw extending along a portion of the gripper guide rail and driven by a drive and includes a core shaft, a helically threaded first sleeve fixed to the shaft at a gripper receiving end thereof; a helically threaded second sleeve of diminishing pitch axially slidable but non-rotatably mounted on the shaft at the other end thereof; and an axially compressible, resilient helical guide on the shaft between the sleeves for the purpose of compensating for temperature variations of the gripper transporting facilities and to ensure reliable seizure of the grippers via the gripper reversing input means. A means defining a storage space along a section of guide rail for interim storage of grippers between the return screw and the gripper input means completes the basic return system.

A storage space alone along the rail could not achieve this goal because the gripping means must be fed to the gripper input device under a certain bias so as to ensure that the gripping means are safely and reliably seized thereby. The axially compressible return screw provides this bias for the gripping means by successively forcing said grippers into the storage space. In case minor length variations should occur throughout the entire conveying system due to temperature variations or even due to readjustments of the transversal stretch ratio, then such variations would be compensated for by enabling the storage space to effectively elongate or contract by corresponding automatic compression or telescoping of the return screw. Axial compression of the return screw is accomplished by elastic deformation of the helical guide provided for the purpose, the forces causing such deformation being reaction forces from the bias against the last gripper advanced by the return screw to the storage area.

In a preferred embodiment of the present invention, adjacent to the gripper discharge end of the return screw there is provided a short storage space for accommodating only some of the gripping means which abut each other within the space. The gripping means are advanced within the storage space as each new gripper is advanced thereto so that the gripper input wheel can pick up a gripping means safely in each case. With each revolution the return screw dispenses one gripping means into the storage space. Lead and speed of the return screw as well the speed of the gripper input wheel are tuned to each other in such a way that the basic number of gripping means inside the storage space remains unchanged. It is, however, not necessary for the return screw and the gripper input wheel to be absolutely precisely synchronized because minor variations can readily be compensated for by compression of the resilient helical guide of the return screw in a manner described hereinbelow.

Another embodiment of the invention provides the possibility of observing and inspecting the gripping means while the machine is in operation. Gripping means used in simultaneous biaxial stretching machines of the type under consideration are very heavily strained and, therefore, exposed to a high wear and tear. It would mean considerable outage time if the entire machine would have to be stopped for inspection of the grippers or for maintenance purposes.

To solve this problem it is proposed, according to the invention, that the storage space between the runout or gripper discharge end of the return screw and the inlet to a gripper input wheel be arranged for accommodation of several gripping means (up to ten or more) and that a means for temporarily enlarging the storage space and relieving the forces urging the grippers into abutting relationship with each other be provided.

Obviously, in this embodiment of the invention the storage space also serves for compensation of synchronizing errors of the type described earlier herein, but additionally such storing of a large number of gripping means permits gripper inspection in that a sufficient number of gripping means is kept available in the storage space for enabling the gripper input means to continue to operate, while the infeed of additional grippers into the storage space serving the gripper input means is temporarily interrupted by compressing the return screw by a special system operating in synchronism with the gripper advancing motion. During such an inspection, the machine should preferably be operated at reduced speed.

In order to prevent continued movement of gripping means through the gripper input during this type operation, the screw must be positively compressed so that the grippers dispensed due to rotational movement of the transport screw are simply fed to another portion of the storage space which gradually enlarges due to compression of the screw. To this end the present invention provides for an adjusting spindle and nut having fitted on the spindle nut a guide fork for the sleeve at the outlet end of the return screw. Conventional variable speed reversible gearing which can be coupled with the main drive shaft at will for driving said adjusting spindle is adjusted so that the adjusting speed of the spindle nut is equal to the advance speed at the outlet end of the return screw in one rotational direction for compressing the helical guide and greater than said advance speed for expansion of said helical guide. The term "advance speed" as used here of the return screw is defined as the product of speed and lead at the outlet end of the return screw. In case of a single-thread return screw the lead is equal to the advance created by one revolution.

This arrangement provides, by compression of the helical guide, that the oncoming grippers can be deposited successively into a gradually enlarging first portion of the the storage space while the grippers in the second portion of the storage space continue to be fed to the gripper input means. Accordingly, the gripping means in the storage space can be readily inspected and exchanged for instance with the aid of a conventional release means incorporated in the guide rail.

BRIEF DESCRIPTION OF THE DRAWINGS

The invention will now be described by way of exemplified embodiments with reference to the accompanying drawings in which:

FIG. 2 is a schematic top view of one of the return screws of a simultaneous biaxial stretching machine;

FIG. 3 is a side elevation of the device of FIG. 1;

FIG. 4 is a view, partly in section, of a fragmentary portion of the return screw;

FIG. 5 is a fragmentary view of a modification of the return screw;

FIG. 6 shows a modified embodiment of the return screw section;

FIG. 7 is a section along the line VII—VII in FIG. 6;

FIG. 8 is a side view in the direction VIII in FIG. 6; and

FIG. 9 is a view taken along IX—IX of FIG. 6.

DESCRIPTION OF A PREFERRED EMBODIMENT

Figure 1:
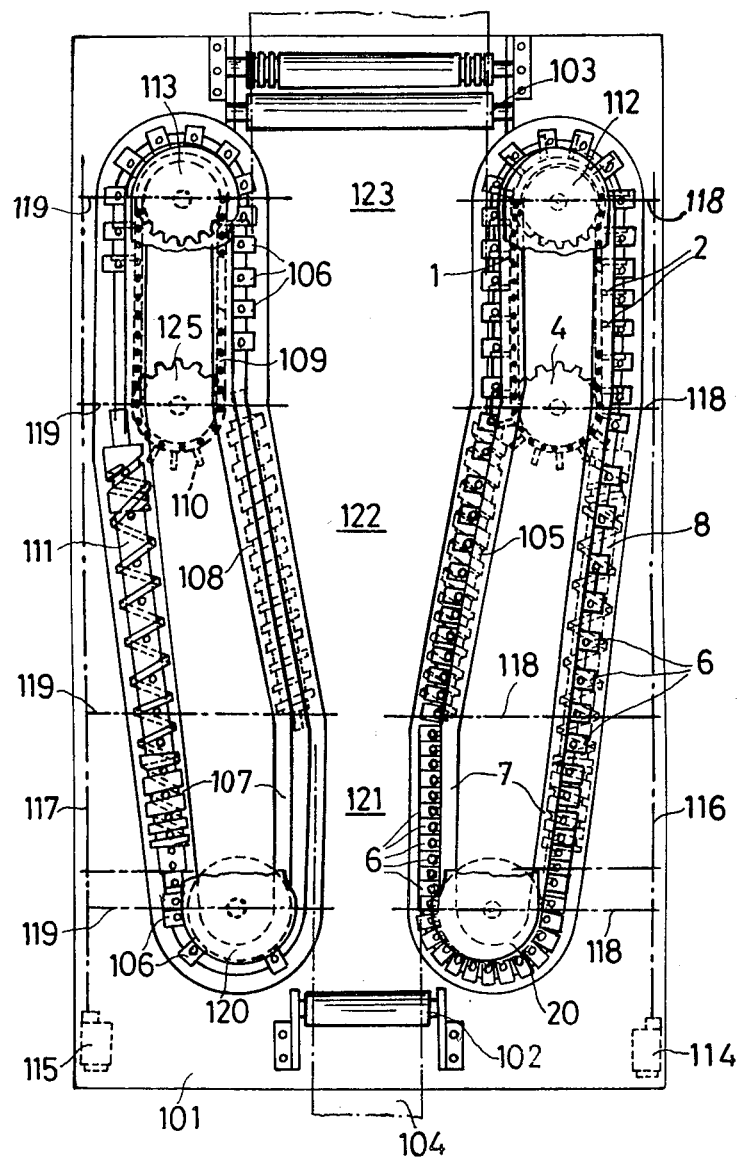
FIG. 1 is a schematic plan view of the simultaneous biaxial stretching machine.

In FIG. 1 a main frame 101 of the machine incorporating the present invention supports a material infeed guide roll 102 and a discharge guide roll 103 for receiving and guiding a thermoplastic film 104. The frame 101 supports two closed loop gripper guide rails 7 and 107 which are arranged in mirror image-like to each other. The rails 7 and 107 may have any desired construction which is not shown in detail, but which enables them to slidably engage the multiple grippers 6, 106 for gripping the lateral edges of the film 104. The transportation means for the grippers 6, 106 comprise gripper input wheels 20, 120 on the input side of the machine and having cam means for seizing and feeding the grippers, screw 105, 108 each having a groove with an increasing pitch, gripper return feeding means comprising gripper transport and return chains 1, 109 with carrier dogs 2, 110 and returning screws 8, 111 as described in detail below. The transport chains 1, 109 are led over gripper reversing and return wheels 112, 113, 4, 125.

Electrical motors 114, 115 drive main shafts 116, 117 which rotate by gearing means shafts 118, 119 for driving the reversing wheels and the screws with a prescribed velocity.

The film is heated in a pretreatment zone 121. The grippers 6, 106 engage the film. In a stretching zone 122 the film is simultaneously stretched in longitudinal and transverse directions. In an aftertreatment zone 123, and stretched and oriented structure of the film is fixed.

FIG. 2 and 3 show the end portion of the return line on one side of the simultaneous biaxial stretching machine. Within the return line, the gripping means are first transported by a transport chain 1 with carrier dogs 2 in the direction indicated by the arrow 3 and running over a reversing and returning wheel 4. The gripping means are only schematically represented by a guide bolt 5 in FIG. 2 on which the carrier dogs 2 would engage in each case. The grippers 6 are shown in schematic representation in FIG. 3: they move on the guide rail 7 which is schematically shown by the dash-and-dot line in FIG. 2. Within the return line there is a return screw 8 formed with progressively diminishing lead. Return screw 8 includes a core shaft 9 mounted in bearing brackets 10 of the machine frame. The core shaft 9 is driven in rotation by a shaft 118 (see FIG. 1) through gears 126, 127 (FIG. 2 and 3) and carries on the inlet end thereof a first cylindrical sleeve 11 with helical cam groove 12 of pitch corresponding to the spacing of the carrier dogs 2 of transport chain 1 for advancing the grippers. The sleeve 11 is firmly clamped in place on the core shaft 9. The sleeve 11 is followed by a cylinder core 13 which is likewise firmly clamped in position and which serves as guide for a resilient helical guide 14 shaped like a coil spring. The lead of said helical guide 14 in relaxed state is a little greater than the pitch of the screw groove 12. In the working or normal position represented in FIGS. 1 and 3, the helical guide 14 is compressed so that its lead is now identical with the pitch of the screw groove 12. In the end portion of said screw 12 there is an edge cutout 15 provided for the end portion of the helical guide 14 to be received and secured therein. Hence, one helical face of the helical guide 14 directly adjoins one lateral face of the screw groove 12 as FIG. 2 clearly shows. The core shaft 9 finally carries another sleeve 16 which is axially shiftable on said core shaft 9, but not rotatable thereon, and which has a helical cam groove 17 with diminishing pitch machined therein. The pitch of said screw groove 17 diminishes in conformity with the longitudinal stretching ratio applicable in each case. The helical guide 14 is inserted and secured in a cutout edge 18 of said screw groove 17, in the way as explained for the sleeve 11. The terminal end of the sleeve 16 is followed by a storage space 19 in which the gripping means move only on the guide rail 7 and abut each other, each gripper driving the next adjacent gripper along as new grippers are advanced into the storage space. At the outlet end of the storage space one gripping means each is seized by every subspace of a gripper input and reversing wheel 20 which feeds the gripping means to the working section of the machine as described in FIG. 1.

The gripping means 6 are successively in shape conforming alignment inside the storage space such as shown in FIG. 3. This spacing, determined by the size of the grippers, is the very initial spacing at which the gripping means will seize the marginal edges of a plastic film to be stretched in the working section of the machine. Consistent with the desired longitudinal stretch ratio, the gripping means are then moved apart in the direction of web advancement with the aid of the progressive lead screws 105, 108 within said working stretch so that the spacing of the grippers is substantially greater at the discharge end of the stretching section and conforms to the spacing of the carrier dogs 2 of the gripper return feeding means. The longitudinal stretch ratio is normally selectable in the range between 2 and 9. The transport speed of the grippers at the terminal end of the stretching zone must be higher in conformity with the longitudinal stretch ratio applied so that the gripping means normally are returned by The transport chain 1 at high speed. From the transport and return chain 1, (considering one side of the machine only at this point, the other side being similar); the grippers are taken over by the screw groove 12. In this transfer position, it is necessary for the screw groove 12 to move in synchronism with the carrier dogs 2 of said transport chain 1. This synchronism can be established comparatively easily as the returning wheel 4 and the core shaft 9 are driven from the same shaft 118. The gripping means are initially conveyed at said high transport speed within range of the return screw i.e. within the screw groove 12 and within range of the helical guide 14. The screw groove 17 then effects a controlled deceleration of the grippers in conformity with but opposite in sense to the longitudinal stretch ratio. The pitch of said screw groove 17 at the runout end is equal to the length of the grippers in the direction of their motion so that the gripping means 6 are directly abutting one another at the outlet end of the screw groove 17, i.e. within the storage space 19. The gripping means inside the storage space 19 are advanced by the continued input of grippers into the space 19 by the return screw, particularly groove 17 of sleeve 16, and are picked up by the subspaces of the input wheels 20, as shown in FIG. 2.

The overall length of a simultaneous biaxial stretching machine can be about 30 meters and the length of the return screw up to 10 meters and over. Since there are varying temperature conditions prevailing throughout the entire machine, the transporting means may readily undergo substantial length variations. The transport chain 1 in particular is susceptible to such length variations which influence the recirculation of the gripping means. The resilient helical guide 14 permits the return screw 8 to expand or contract to the extent required in every particular case so that the storage space 19 is completely filled with gripping means at all times. Compressing of the helical guide 14 from its normal working position results in reduced conveying speed in the direction of gripper motion and expanding the guide means from its normal washing position results in an increase of this speed. Since said helical guide 14 is biased (relatively compressed) in normal working state due to the grippers in the storage space 19, it will be possible both to increase and to decrease the speed at which the grippers are transported automatically in response to temperature variations.

Over the length of the sleeves 11 and 16 of each return screw 8, the guide bolts 5 move in screw grooves 12 or 17, while over the length of the helical guide 14 said guide bolts 5 would be advanced by one of the helical faces only of said helical guide 14. This one-sided guiding action is adequate within the range of said helical guide 14.

FIGS. 4 and 5 represent other embodiments of the sleeve 16. A cylindrical shell 21 (FIG. 4) is clamped, shrunk in place, or otherwise secured on the core shaft 9. The cylindrical shell 21 carries the sleeve 16 with a sliding fit, and is provided with one or more longitudinal keyways 22 to receive a key 23 on the sleeve 16 therein. This provides a longitudinal key guide assembly for the sleeve 16. At each of the face ends of the sleeve 16, there is a sliding bush 24 fitted for easier sliding movement of the sleeve 16 axially on the cylindrical shell 21.

In a modified embodiment according to FIG. 5, the core shaft can be made up from a plurality of guide rods 25 which are retained in endplates 26. FIG. 5 shows only one such endplate 26. The sleeve 16 is axially shiftable on said guide rods 25. Sliding bushes 27 are likewise provided for reducing friction.

FIG. 6 represents another modification of the present invention which in addition to the storage of grippers as described, also permits an inspection and exchange of grippers in need of repair or maintenance. The representation in FIG. 6 corresponds to the representation of FIG. 2. The arrangement of the return screw 8 is unchanged, but the storage space 19' is of substantially greater length in axial extension and arranged for accommodation of ten or even more gripping means 6 which are likewise shown in schematic representation in FIG. 6. Reversible, variable speed gearing 28a can be coupled via coupling 28 (which may be a clutch) with the shaft 118a at will. An adjusting threaded spindle 30 extending parallel to the axis of the core shaft 9 in bearings of the main frame is connected to the gearing 28a through a drive shaft 29. This adjusting spindle 30 carries a spindle nut 31 which carries a guide fork 32 contacting the bottom face plane of the sleeve 16 and including a cutout for the path of the guide bolts 5 (FIG. 9). By corresponding rotation of the adjusting spindle 30, the helical guide 14 can thus be positively and controllably compressed or expanded upwardly or downwardly while grippers are fed to the storage area betwen fork 32 and a stop member 33. Within the storage space 19', a rod 41 is fixed on the main frame as illustrated in FIG. 6. Rod 41 has slidably mounted thereon a carriage 42 on which a stop means 33 is pivotally mounted (FIG. 7). A hydraulic cylinder 43 is provided for the actuation of said stop means 33, so that the same can be swung about axis 33a into the path of advancing grippers and prevents the further travel or indexing of the grippers 6 past member 33 when swung into working position (FIG. 7) thereby effectively separating the storage area 19' between first and second sections on either side of the stop member 33. The carriage 42 in turn is moved axially along rod 41 by a belt 44 (FIG. 8) running over pulleys 45 driven by a reversible motor 46. Motor 46 preferably is electrically operated, and may be controlled through the use of suitable limit switches that sense the end positions of carriage 42 on shaft 41. When the carriage 42 reaches its end position closest to the gripper input wheels (the lower limit as viewed in FIG. 6) the actuator 43 will be activated at the same time motor 46 is reversed to lift the stop 33 out of its position within the storage area. Reverse motion of carriage 42 will then continue until the carriage reaches its starting position as illustrated in FIG. 6.

When the grippers 6 are to be retained in the storage space 19' above stop member 33 as illustrated in FIG. 6 for inspection or repair, that is, when it is desired that they not be fed to input wheel 20 (FIG. 2) temporarily, stop means 33 is pivoted by actuator 43 to active position shown in FIG. 7 to intercept the guide bolts 5 of grippers 6 and gearing 28a is drivingly connected to shaft 118a to shaft 9 through coupling 28 by suitable control means 28b, which may be a manual gear selector or an automatic control means for gearing 28a, as will be described below, which is adjusted to ensure that spindle 30 is rotated in the proper direction and at the proper speed by gearing 28a, continuously or stepwise, as the specific needs of a particular machine may dictate. Thus, the spindle 30 is driven at such speed that the nut 31 and fork 32 are driven upwardly at a speed equal to the downward feed rate of grippers 6 by the sleeve 16 of return screw means 8 whereby the sleeve 16 and guide 14 are driven upwardly while grippers 6 are fed downwardly between members 32 and 33. In practice, guide 14 is compressed the length of one gripper at each full revolution of shaft 9. Since the guide is being continuously compressed by member 32, member 33 and the grippers between members 32 and 33 are substantially being relieved also of spring pressure exerted by guide 14 acting through the line of grippers in the storage area between members 32 and 33. Meanwhile, gripper input wheel means 20 continues to feed grippers to the input side of the machine from the side of stop member 33 facing the wheel 20, and to ensure this continued operation, carriage 42 is driven by belt 44 by motor 46 upon energization of actuator 43 on the carriage. Thus, when stop means 33 is moved to its blocking position, motor 46 begins moving member 33 in the direction of arrow 33' (FIG. 8) to ensure continued feeding of grippers to the input means 20 in indexing fashion. The grippers in the storage area may thus be inspected and replaced conveniently, if desired, since there are no spring forces acting on them, or other positive driving forces moving them in their normal feed direction. Removal of the grippers from the rail is thus facilitated in a conventional manner.

When it is desired to resume normal machine operation, the gripping means accumulated against the stop means 33 are advanced at increased speed after withdrawal of said stop means 33 from its working position. To this end the gearing 28a is reversed so that the adjusting spindle 30 will be turned in opposed sense in such a way that the spindle nut 31 returns to its starting position. The adjusting speed may be great at first during advance of the spindle nut 31, particularly higher than the gripper advance speed at the outlet end of the return screw, and can be reduced by the control 28b towards the end of the movement, in order to make the follow-up grippers adjoin and line up with the grippers ahead of the stop means 33 substantially without shock and impact.

The driving connection to spindle 30 is from shaft 118a, through the coupling 28, which may be a clutch unit, through the gear box 28a through shaft 29. The spindle nut 32 may be actuated from its lower position as illustrated in FIG. 6 to its upper limit as shown in phantom lines by the rotary movement of the spindle 30 in the proper direction. For simplicity, a single speed, reversible gear mechanism is shown at 28a, but it will be apparent that a different speed in reverse as opposed to forward drive is obtainable simply by varying the relative sizes of the forward and reverse gear elements. In this instance, for example, pinion gears 130, 131 could be made in different sizes to alter the gear ratio between forward and reverse rotation of drive shaft 29. Likewise, gear box 28a could include one or more reverse drive ratios that are selectable under the control of unit 28a in a manner well known per se in gearing technology. Limit switches $S_1$, $S_2$ connected to control unit 28b through leads $L_1$, $L_2$ are utilized to detect the end positions of spindle fork 32 on spindle 30, while position sensing switches $S_3$, $S_4$ connected to control unit 28b through lead $L_3$ and having fork position sensors 132, 133 that can be tripped by the passing fork element 32 as it traverses the rotating spindle 30 can be utilized when it is desired to vary the speed the rotation of drive shaft 29 with respect to the speed of shaft 118a while the fork 32 is progressively moving along the spindle 30.

In the simplest embodiment, spindle fork 32 is driven away from the gripper input wheel (upwardly as viewed in FIG. 6) at a single speed until its upper limit position is reached and is driven towards the gripper input wheel (downwardly as viewed in FIG. 6) at the same or a different speed until its lower limit position is reached. However, as indicated above, it is advantageous to begin the advance travel of fork 32 quickly and then gradually slow its movement as the lower limit position is reached. This can readily be achieved by sensing the position of fork 32 as it moves downwardly along the spindle 30 and changing the drive gear ratios in gearing 28a by means of control unit 28b through the use of the position sensing switches $S_3$, $S_4$. The switches $S_3$, $S_4$ are of any conventional design, as are the switches $S_1$, $S_2$, and the control unit 28b could also be hydraulically or pneumatically controlled, if desired. Gearing 28a could be continuously and infinitely variable, such as a variable diameter pulley arrangement utilizing drive belts, or any other conventional drive gear unit that will achieve the desired transmittal of speed ratios between shafts 118a and 29.

The activation of actuator 43 (FIG. 7) to initiate operation of motor 46 for moving carriage 42 and the stop means 33 along shaft 41 is coordinated with actuation of spindle 32 in any desired fashion, preferably through a suitable electrical control unit (not illustrated).

I claim:

1. An improved gripper return means for a machine for treating and simultaneously biaxially stretching thermoplastic web material under varying thermal conditions, said machine including: guide rails extending along closed loop paths on each side of the machine, multiple web grippers slidably secured to the guide rails for engaging opposite side portions of web material to be treated in the machine, transport means for the grippers on each side of the machine, the transport means each comprising, in sequence about the guide rail paths, gripper infeeding means for infeeding grippers on the guide rails to the working stretch of the machine at a first velocity, a gripper advancing drive means for progressively increasing the speed of the grippers along the guide rails to a second velocity and thereby extending the spacing between the grippers along the guide rails, a gripper return feeding means for advancing grippers received from said gripper advancing drive means in a reverse direction at said second velocity, and a gripper return means for receiving grippers from said gripper return feeding means at said second velocity and advancing the grippers to a gripper storage area along said guide rails at a progressively decreasing velocity, whereby the grippers may be supplied to the gripper infeeding means at said first velocity; said improved gripper return means each comprising a variable length screw comprising an elongated shaft extending along a portion of said guide rail and being driven synchronously with said gripper return feeding means; said shaft having a sleeve having a helical gripper advancing cam on its periphery, said sleeve being slidably mounted adjacent one end of said shaft but fixed for rotation therewith adjacent a gripper storage area, the gripper storage area being defined as an area between said sleeve and said gripper infeeding means along a portion of said guide rail, said helical gripper cam having a progressively decreasing lead for progressively slowing the advancing speed of each gripper element advanced along said sleeve before said grippers are advanced to said storage area; said shaft furthermore having a resilient helical guide means in the form of a coil spring concentrically mounted thereon on the side of said sleeve towards said gripper return feeding means; means for securing one end of said helical guide means to said sleeve, and means for fixedly securing the opposite other end of said helical guide means with respect to said shaft adjacent said gripper return feeding means, said sleeve being thereby resiliently retained in an axial sense along said shaft by said resilient helical guide means while being fixedly secured with respect to said shaft in a rotational sense; a driving protrusion on each of said grippers for enabling the advancement thereof by said transport means; said resilient helical guide having a helical cam surface of uniform pitch for engaging said gripper protrusion and advancing each gripper from said gripper return feeding means to said sleeve when said shaft is rotated; said sleeve and said resilient helical guide being joined together so as to permit advancement of said protrusion of each gripper continuously along said shaft without interruption when said shaft is rotating; said sleeve slowing down the velocity of each gripper advanced thereby to said storage space and being resiliently urged against the last-advanced gripper in said storage space in an axial direction along said shaft by said resilient helical guide means when a predetermined number of grippers are in said storage area in abutting relationship along said guide rail to thereby ensure reliable seizure of grippers in said storage area by said gripper infeeding means and to compensate for thermally induced variations of said gripper transport means along the length of each of said guide rails.

2. The improved gripper return means as recited in claim 1, further wherein said means for fixedly securing the opposite other end of said resilient helical guide means with respect to said shaft comprises a second sleeve element rigidly secured to said shaft, said second sleeve element having a helical cam peripheral portion for receiving and engaging the projection of each gripper advanced by said gripper return feeding means and for advancing each gripper to said resilient helical guide means, joint connection means between one end of said second sleeve and the said opposite end of said resilient helical guide means, said joint connection permitting smooth, continuous advancement of each gripper projection along said second sleeve and along said resilient helical guide means across said joint connection means.

3. The improved gripper return means as recited in claim 1, further including movable means for selectively engaging and positively displacing said sleeve along said shaft in a direction away from said gripper infeeding means against the bias of said resilient helical guide means at a predetermined rate of speed corresponding to the rate of advancement of said grippers at the gripper discharge end of the gripper return means, whereby said storage area is enlarged along said guide rail and whereby the bias of said resilient helical guide means exerted against abutting grippers in said storage area through said sleeve is removed while grippers are advanced toward said storage area.

4. The improved gripper return means as recited in claim 3, further including a selectively adjustable gripper stop means movable into and out of said gripper storage area between protrusions of adjacent, abutting grippers in said storage area, said stop means, when moved into said gripper storage area, dividing said area into two areas, including a first storage area extending between said stop means and said sleeve, and a second storage area extending between said stop means and said gripper infeeding means: means for moving said stop means toward said gripper infeeding means along said guide rail at a predetermined speed corresponding to the velocity at which said gripper infeeding means advances said grippers to the working stretch of the machine, and being operable when said means for positively displacing said sleeve is operating, whereby, when the bias of said resilient helical guide means is removed from the grippers in the storage area, grippers in said second storage area may be continually and positively supplied to said gripper infeeding means by said stop means.

5. The improved gripper return means recited in claim 4, further including means for selectively driving said movable means for positively displacing said sleeve in either of two opposite directions along said shaft and at different velocities in either direction.

6. The improved gripper return means recited in claim 5, further wherein said means for selectively driving said movable means for positively displacing said sleeve along said shaft includes a threaded spindle drivingly connected to a fork element engaging the end of said sleeve closest to said storage area, and means for selectively rotating said spindle in either direction at different speeds in each direction.

7. The improved gripper return means recited in claim 6, further wherein said means for moving said gripper stop means along said guide rail is reversible for moving said stop means in either direction along said rail, and furthermore including control means for the gripper stop moving means for enabling the stop means to be moved along said rail within said storage area towards said gripper infeeding means up to a limit position when the stop means is moved into the storage area, and to be moved in a reverse direction along said rail within the storage area up to a limit position when the stop means is moved out of the storage area.

8. In a machine for simultaneously biaxially stretching a web of thermoplastic sheet material under thermally varying conditions in a continuous process, said machine including: a web preliminary treatment zone, a web biaxial stretching zone, and a web after-treatment zone; web grippers movable along opposite sides of said machine and arranged to engage opposite edges of web material advanced through said zones; continuous gripper guide rails on each side of the machine for slidably engaging and guiding said grippers along predetermined closed-loop paths on both sides of said machine; means on opposite sides of said machine for engaging and moving said grippers along said guide rails, including gripper advancing drive means in said web stretching zone, a gripper return means following said web after-treatment zone, a gripper input means in advance of said web preliminary treatment zone, and a gripper return feeding means in advance of said gripper return means; means for actuating said gripper advancing drive means, gripper return means, gripper return feeding means, and gripper input means; said gripper advancing drive means being arranged to cause a progressively increasing rate of advancement of each of said grippers through said web stretching zone on opposite sides of the machine to cause stretching of said web engaged by the grippers along the direction of web and gripper advancement in said stretching zone; said gripper guide rails on opposite sides of the machine diverging from each other in the direction the grippers are advanced to cause stretching of said web transversely of said web advancement direction in said web stretching zone when said grippers are advanced therethrough in engagement with opposite edges of the web material; said gripper return feeding means advancing said grippers to said gripper return means at a rate of motion corresponding to the velocity of said grippers at the end of the web stretching zone, said rate of motion being greater than the velocity at which said grippers are advanced through said gripper input means; the improvement comprising; each of said gripper return means comprising a variable length return screw assembly for advancing said grippers at a progressively slower rate of movement, and a gripper storage area extending along said guide rail between said screw assembly and said gripper input means for receiving grippers advanced by said gripper return means, said grippers being moved along said rail in said storage area and towards said gripper input means by reason of the continuous advancement of grippers into the said storage area by said gripper return means, said grippers abutting each other and being freely slidable along said guide rail in said storage area; said variable length return screw assembly comprising a core shaft; means for rotatably driving said core shaft synchronously with said gripper return feeding means; a first cylindrical sleeve element having helical grooves of uniform pitch thereon concentrically fixed to said core shaft at the gripper receiving end thereof, said first sleeve being disposed adjacent said gripper return feeding means and extending along a portion of said guide rail; a second cylindrical sleeve element having helical grooves of diminishing pitch thereon mounted concentrically on said core shaft at the gripper discharge end thereof adjacent said storage area, said second sleeve element being mounted for slidable movement along said core shaft while being fixed thereto in a rotational sense; and an axially resilient helical guide means in the form of a coil spring concentrically mounted on said core shaft between said sleeve elements and secured at its opposite ends to said sleeve elements in such a manner that the opposite ends of the helical guide means intersect and interfit with the helical grooves of said sleeves in a continuous manner; said grippers each having a projection thereon for engaging said helical grooves in said sleeve elements and said helical guide means; said return screw, when rotated, advancing said grippers along said guide rail at a progressively decreasing velocity between said gripper return feeding means and said storage area by engaging each gripper through its respective projection at said first sleeve element as each gripper is discharged from said gripper return feeding means, and thereafter advancing each gripper along said first sleeve element, helical guide means, and second sleeve element by means of said projection; said second sleeve means slowing the velocity of each gripper before its advancement to the said storage area by reason of the said grooves of diminishing pitch thereon; said second sleeve element of each return screw being free to react to variable rate of gripper movement into and through said storage area resulting from temperature induced dimensional variations within the said machine and for ensuring reliable advancement of grippers to said gripper input means by sliding axially along said core shaft to vary the effective length of said return screw assembly along said guide rail, said helical guide means normally being precompressed a selected amount in its assembled working position when a predetermined number of grippers are in said storage area in abutting relationship along said guide rail, said second sleeve element normally slidably axially engaging the projection of the last gripper discharged into said storage area by said gripper return screw assembly and being resiliently urged thereagainst by said precompressed helical guide means.

* * * * *